US009999987B2

(12) United States Patent
Griffin et al.

(10) Patent No.: US 9,999,987 B2
(45) Date of Patent: Jun. 19, 2018

(54) SYSTEM AND METHOD FOR BUCKING A STEM

(71) Applicant: Griffin Lumber Company

(72) Inventors: Jesse Slade Griffin, Cordele, GA (US); William Henry Griffin, Cordele, GA (US); Jeremy Joseph Griffin, Cordele, GA (US); Charlie Julian Griffin, Cordele, GA (US)

(73) Assignee: Griffin Lumber Company, Cordele, GA (US)

( * ) Notice: Subject to any disclaimer, the term of this patent is extended or adjusted under 35 U.S.C. 154(b) by 174 days.

(21) Appl. No.: 14/935,726

(22) Filed: Nov. 9, 2015

(65) Prior Publication Data

US 2016/0129606 A1 May 12, 2016

Related U.S. Application Data

(60) Provisional application No. 62/078,823, filed on Nov. 12, 2014.

(51) Int. Cl.
B27B 7/00 (2006.01)
B26D 7/06 (2006.01)
B26D 5/00 (2006.01)
B23D 59/00 (2006.01)

(52) U.S. Cl.
CPC .............. B27B 7/00 (2013.01); B23D 59/001 (2013.01); B26D 5/007 (2013.01); B26D 7/0625 (2013.01)

(58) Field of Classification Search
CPC .... B27B 7/00; B27B 7/02; B27B 7/04; B27B 1/00; B27B 1/005; B27B 1/007; B23D 59/001; B23D 59/002; B23Q 15/20; B23Q 15/22; B23Q 15/225; B23Q 15/24; B23Q 15/26; B23Q 16/02
See application file for complete search history.

(56) References Cited

U.S. PATENT DOCUMENTS

| 3,736,968 | A | * | 6/1973 | Mason | B23D 59/008 144/3.1 |
| 3,812,951 | A | * | 5/1974 | Fullaway | B27B 5/228 198/458 |
| 3,890,509 | A | * | 6/1975 | Maxey | B27B 1/00 144/357 |
| 3,970,128 | A | * | 7/1976 | Kohlberg | B23Q 7/18 144/245.2 |
| 3,983,403 | A | * | 9/1976 | Dahlstrom | G01B 11/046 144/357 |
| 4,149,089 | A | * | 4/1979 | Idelsohn | B27B 1/007 144/356 |

(Continued)

Primary Examiner — Jason Daniel Prone
Assistant Examiner — Richard Crosby, Jr.
(74) Attorney, Agent, or Firm — Jeffrey S. Melcher; Manelli Selter PLLC

(57) ABSTRACT

Provided is a method for bucking a stem that utilizes the combination of moving sensor and a fixed sensor. The fixed sensor measures a location of a first end of the stem travelling on a conveyor to determine a travel distance the first end has moved past the fixed sensor. The movable sensor measures a location of a second end of the stem to determine a sensor distance between the fixed sensor and the movable sensor. The length of the stem is determined by adding the travel distance to the sensor distance.

9 Claims, 3 Drawing Sheets

(56) References Cited

U.S. PATENT DOCUMENTS

| | | | | |
|---|---|---|---|---|
| 4,164,248 A * | 8/1979 | Rysti | ................ | B27B 1/002 144/2.1 |
| 4,188,544 A * | 2/1980 | Chasson | ................ | B27B 31/06 144/357 |
| 4,195,346 A * | 3/1980 | Schroder | ................ | B27B 1/007 144/357 |
| 4,468,993 A * | 9/1984 | McCown | ................ | B23D 59/008 83/112 |
| 4,541,722 A * | 9/1985 | Jenks | ................ | B27B 1/007 250/559.43 |
| 4,907,294 A * | 3/1990 | Bolton | ................ | B27B 31/06 144/357 |
| 5,579,671 A * | 12/1996 | Bowlin | ................ | B23D 59/008 83/425.2 |
| 5,680,802 A * | 10/1997 | Murray | ................ | B23D 59/001 144/215.2 |
| 6,089,135 A * | 7/2000 | Murray | ................ | B23D 59/001 83/209 |
| 6,219,585 B1 * | 4/2001 | Hughes | ................ | G01B 11/08 144/357 |
| 6,539,993 B1 * | 4/2003 | Starr | ................ | B23D 59/008 144/208.1 |
| 6,631,006 B2 * | 10/2003 | Dick | ................ | B23D 47/042 356/237.2 |
| 6,923,101 B2 * | 8/2005 | Culpepper | ................ | B23D 45/20 83/287 |
| 7,040,207 B2 * | 5/2006 | Lindenblatt | ................ | B23D 45/10 144/379 |
| 7,080,431 B2 * | 7/2006 | Sawyer | ................ | B23D 47/04 144/35.1 |
| 7,171,738 B2 * | 2/2007 | Dick | ................ | B27M 1/08 29/563 |
| 7,792,602 B2 * | 9/2010 | Dick | ................ | B23D 59/008 144/356 |
| 7,966,714 B2 * | 6/2011 | Dick | ................ | B27M 1/08 144/35.1 |
| 9,561,554 B2 * | 2/2017 | Behringer | ................ | B23D 53/005 |
| 2009/0095377 A1 * | 4/2009 | Barker | ................ | B23Q 17/20 144/357 |
| 2009/0255607 A1 * | 10/2009 | Barker | ................ | B23D 59/008 144/357 |
| 2016/0129606 A1 * | 5/2016 | Griffin | ................ | B27B 7/00 83/13 |

* cited by examiner

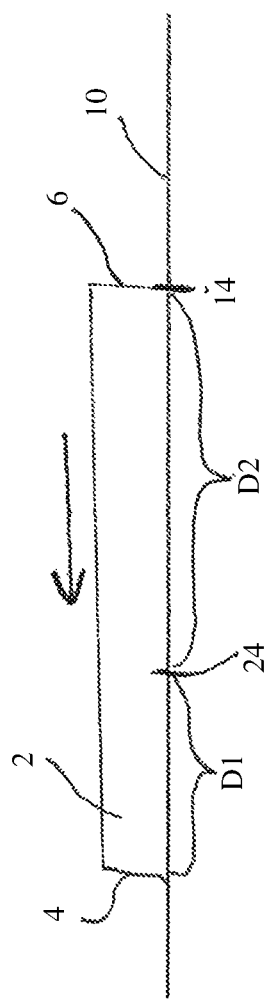

SYSTEM AND METHOD FOR BUCKING A STEM

FIELD OF THE INVENTION

The invention relates to the use of the combination of a fixed sensor and a moving sensor to measure a length of an unbucked log (stem) travelling on a conveyor, and using a computer to calculate the most favorable lengths to buck the stem into based on price and market reasons.

BACKGROUND OF THE INVENTION

It is desired that an unbucked log's (stem's) diameter be measured along the stem's length, along with ovality, exact profile shapes, etc. and combined with crook and bow and length to make the best possible bucking solution to an unbucked log. To do this, typically the stem must be conveyed through a sensor gathering this information as it passes through. Often times, there is insufficient room for sensor measuring on a system or the cost is too high. Scanners that scan the entire length of a stem, typically 50 to 70 feet in length, are complicated and expensive.

Measuring length only is a low cost alternative used in some instances. There typically is insufficient room for the length of the log to be measured by passing the log through a sensor site. Multiple sensor sites can be used to reduce the length but there is a limit how much the distance can be reduced. Many existing systems are still manual, i.e. an operator looks at the stem and decides how long to make the first cut, cuts the stem, and then decides how long to make the second cut, cuts the stem, then the third cut, etc. There are usually from 2 to 4 logs cut from each stem. Manually cutting stems creates undesirable amounts of waste because the last cut is usually the residual amount which could be an undesirable length for marketing reasons or a short length that is not desirable, or in the worst case a too short waste piece.

SUMMARY OF THE INVENTION

This present system and method solves the prior art problems by incorporating a moving sensor in combination with a fixed sensor, and encoding the conveyor.

BRIEF DESCRIPTION OF THE DRAWINGS

Provided is method for bucking a stem into logs comprising:
  conveying a stem in a first direction on a conveyor, the stem having a first end and a second end;
  determining when the first end passes a fixed sensor constructed to sense the first end of the stem passing by the fixed sensor while travelling on the conveyor, the fixed sensor is connected to a computer;
  after the first end is sensed by the fixed sensor, moving a movable sensor towards the second end and when the movable sensor senses a location of the second end the movable sensor stops moving, the movable sensor is connected to the computer;
  determining by the computer a travel distance the first end has travelled past the fixed sensor when the movable sensor senses the location of the second end;
  determining by the computer a sensor distance between the fixed sensor and the movable sensor when the movable sensor senses the location of the second end;
  adding by the computer the travel distance to the sensor distance to calculate a length of the stem;
  determining by the computer a buck location on the stem based on the length of the stem; and
  bucking the stem at the buck location to produce a log Provided is a method for bucking a stem into logs comprising:
  providing a conveyor constructed for conveying a stem in a first direction, the stem having a first end and a second end;
  providing a fixed sensor configured to sense when the first end of the stem passes by the fixed sensor while travelling on the conveyor;
  providing a movable sensor configured to move in the first direction and a second direction opposite the first direction as the conveyor moves to determine a location of the second end of the stem travelling on the conveyor;
  providing a computer connected to the movable sensor and the fixed sensor;
  conveying the stem in a first direction on the conveyor;
  determining by the computer when the first end passes the fixed sensor while travelling on the conveyor;
  moving the movable sensor towards the second end and the movable sensor sensing the location of the second end;
  the computer determining a travel distance the first end has travelled past the fixed sensor when the movable sensor senses the location of the second end;
  the computer determining a sensor distance between the fixed sensor and the movable sensor when the movable sensor senses the location of the second end;
  the computer adding the travel distance to the sensor distance to calculate a length of the stem; and
  the computer determining a buck location on the stem based on the length of the stem
FIG. 3 illustrates a method of measuring the length of the stem.

DETAILED DESCRIPTION OF THE INVENTION

Figure 1:
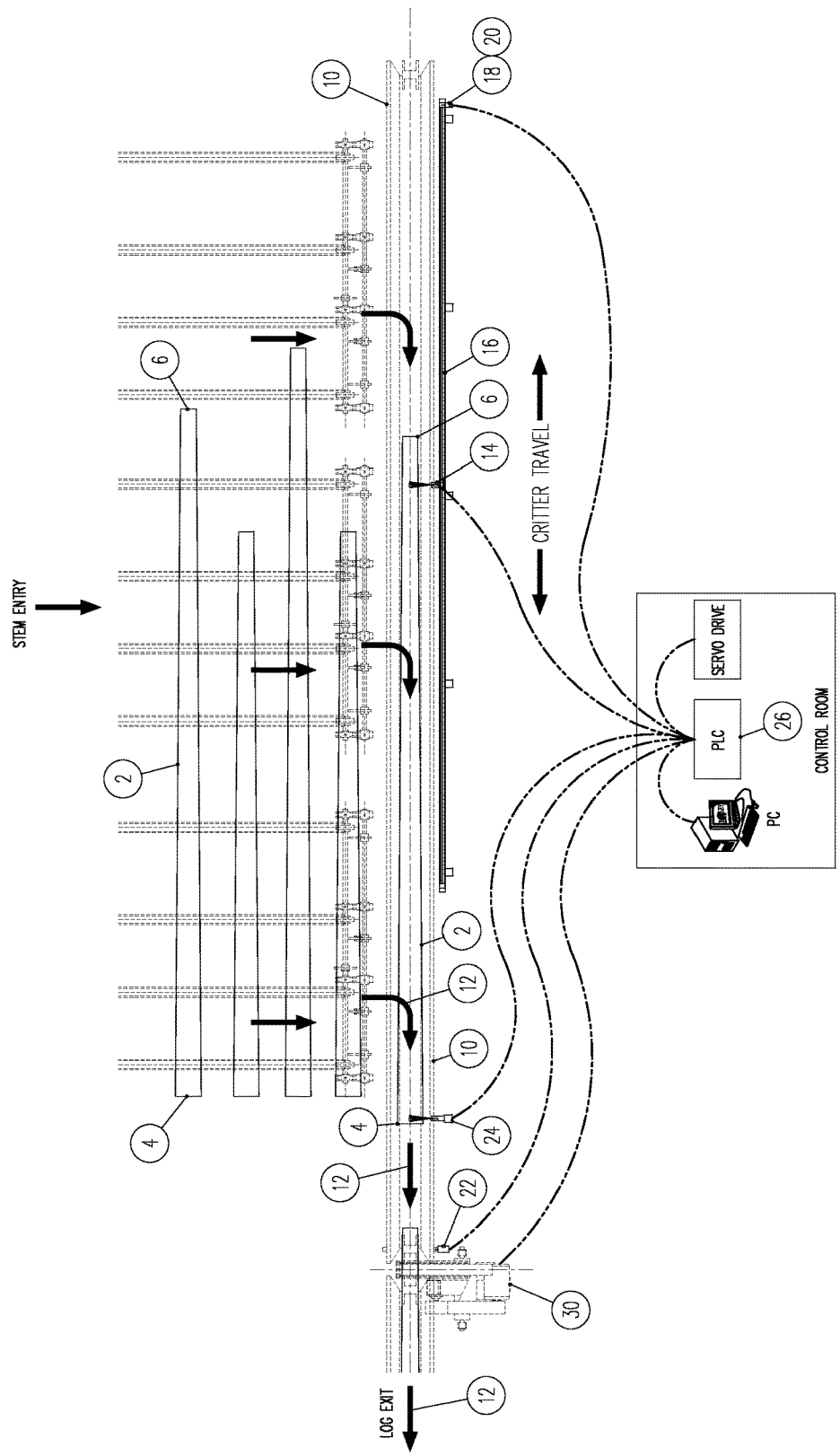
FIG. 1 illustrates a top view of the system.
Figure 2:
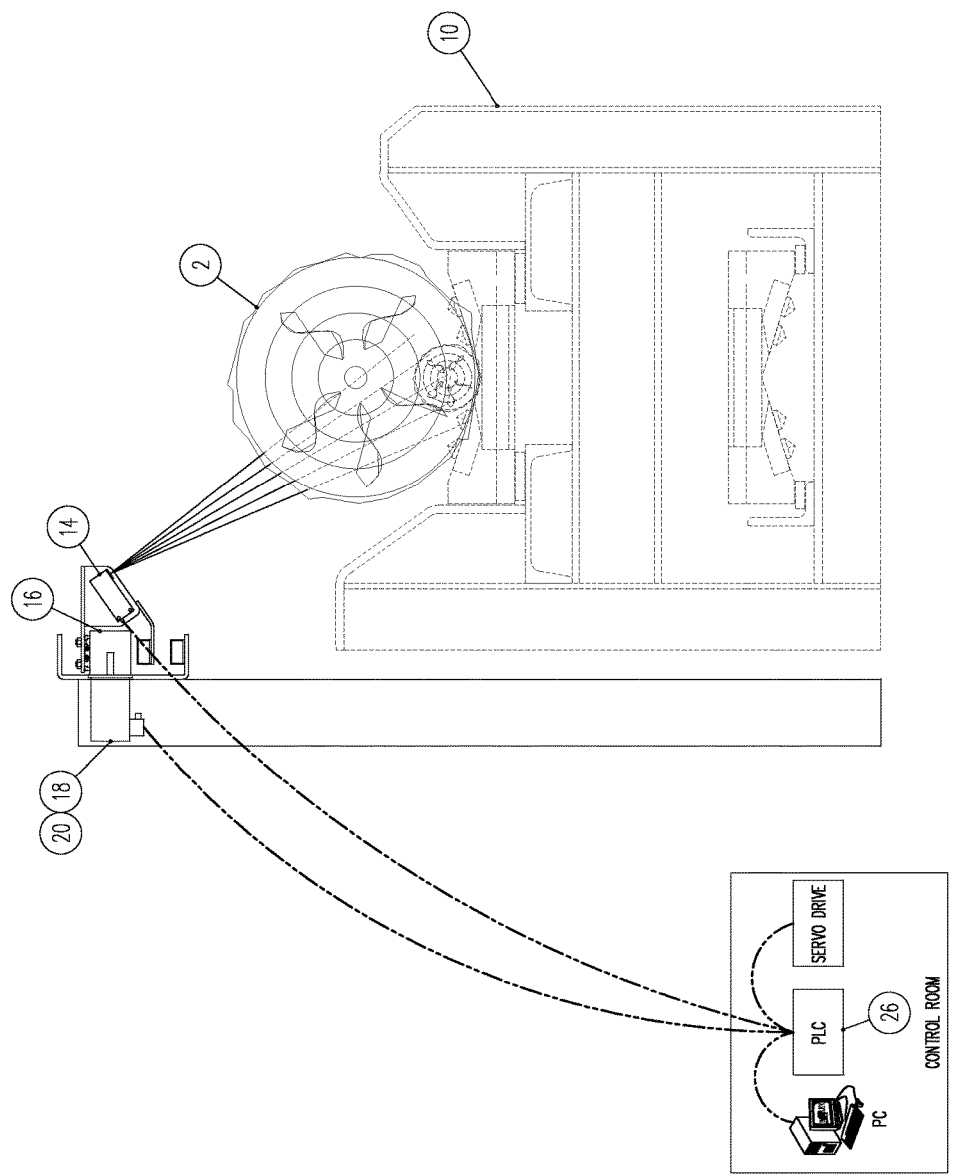
FIG. 2 illustrates an end view of the system.

The invention will be explained with reference to the attached non-limiting FIGS. 1-3 illustrate a non-limiting example of the system and method for determining a buck location of an unbucked log (stem) 2 having a first end 4 and second end 6. A conveyor 10 is provided for conveying the stem 2 in a first direction so that the first end 4 is downstream the second end 6. Conveyor's 10 are now well known in the art and any conveyor 10 suitable for conveying a stem 2 can be used and modified according to the present invention.

A movable sensor 14 is mounted on a track 16 and propelled by a motor 18 in the first direction and a second direction opposite the first direction the stem 2 travels on the conveyor 10. The movable sensor's 14 movement can be encoded by use of a moveable sensor encoder 20 that is connected to a computer 26 to determine the exact location on the track 16 the movable sensor 14 is at any given time.

The conveyor 10 can be encoded by use of a conveyor encoder 22 connected to the computer 26 to determine the position of the conveyor 10 at any given time.

A fixed sensor 24 can be employed to sense when the first end 4 passes by the fixed sensor 24 as the stem 2 travels on the conveyor 10. The fixed sensor 24 is connected to the computer 26 and the fixed location of the fixed sensor 24 is known by the computer.

When the fixed sensor 24 senses the first end 4 the movable sensor 14 moves in either the first or second direction to determine the location of the second end 6. When the location of the second end 6 is determined, the sensor distance D2 between the fixed sensor 24 and the movable sensor 14 is determined using the movable encoder 20. The travel distance D1 the stem 2 has travelled on the conveyor from when the fixed sensor 24 senses the first end 4 to when the movable sensor determines the location of the second end 6 is calculated using the conveyor encoder 22.

If the movable sensor 14 senses the log 2 when the first end 4 is sensed by the fixed sensor 24, the movable sensor 14 moves in the second direction and determines the location of the second end 6 when the log 2 is no longer sensed. If the movable sensor 14 does not sense the log 2 when the first end 4 is sensed by the fixed sensor 24, the movable sensor 14 moves in the first direction and determines the location of the second end 6 when the log 2 is sensed. The movable sensor 14 stops moving when the location of the second end 6 is determined. In this manner, the movable sensor 14 can be at random starting locations on the track wherever the location of the previous second end 16 was determined.

The computer 26 adds the sensor distance D2 to the travel distance D1 to calculate the length of the stem 2. The computer 26 can be programmed to consider the length of the stem 2 in addition to other factors, such as price and market reasons as desired, which usually can be biased using price tables, to calculate the buck location(s) that provides minimum waste or other desired features. Usually, the stem 2 is bucked into from 2 to 4 logs of about 20 feet in length, although any desired length of the logs can be produced.

The system can also include a saw 30 connected to the computer 26. The saw 30 is constructed to buck the stem 2 at the buck location(s) calculated by the computer 26. Any suitable saw 30 can be used. Saws 30 for bucking stems are now well known in the art.

The computer 26 can be any suitable computer control system. Control systems are now well known. A commercial example of a suitable encoder is an Electrocam PS4256 absolute grey code encoder. A commercial example of the computer 26 is an A.B.ControLogix 5000 series. Any suitable sensor for sensing the stem 2 can used in the sensors 14 and 24, such as photoelectric, laser, camera, or other.

Instead of using the conveyor encoder 22 to determine the travel distance D1, sensors or other means can be used to determine the travel distance D1 the first end has moved passed the fixed sensor 24. Travel distance means can be any device(s) capable of determining the distance the second end 6 has travelled past the fixed sensor 24, which includes but is not limited to the conveyor encoder 22 and/or sensors.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A method for bucking a stem into logs comprising:
   conveying a stem in a first direction on a conveyor, the stem having a first end and a second end;
   determining when the first end passes a fixed sensor constructed to sense the first end of the stem passing by the fixed sensor while travelling on the conveyor, the fixed sensor is connected to a computer;
   after the first end is sensed by the fixed sensor, moving a movable sensor towards the second end and when the movable sensor senses a location of the second end the movable sensor stops moving, the movable sensor is connected to the computer;
   determining by the computer a travel distance the first end has travelled past the fixed sensor when the movable sensor senses the location of the second end;
   determining by the computer a sensor distance between the fixed sensor and the movable sensor when the movable sensor senses the location of the second end;
   adding by the computer the travel distance to the sensor distance to calculate a length of the stem;
   determining by the computer a buck location on the stem based on the length of the stem; and
   bucking the stem at the buck location to produce a log.

2. The method according to claim 1, wherein the conveyor is encoded with a conveyor encoder that is connected to the computer so that the computer knows the location of the conveyor, the movable sensor is encoded with a movable encoder connected to the computer so that the computer knows the location of the movable sensor, the location of the fixed sensor is known by the computer, and the method further comprises using a computer to calculate the travel distance and the sensor distance by input from the conveyor encoder and the moveable encoder.

3. The method according to claim 2, further comprising using the computer to determine the buck location.

4. The method according to claim 3, further comprising cutting the stem at the buck location using a saw in communication with the computer.

5. A method for bucking a stem into logs comprising:
   providing a conveyor constructed for conveying a stem in a first direction, the stem having a first end and a second end;
   providing a fixed sensor configured to sense when the first end of the stem passes by the fixed sensor while travelling on the conveyor;
   providing a movable sensor configured to move in the first direction and a second direction opposite the first direction as the conveyor moves to determine a location of the second end of the stem travelling on the conveyor;
   providing a computer connected to the movable sensor and the fixed sensor;
   conveying the stem in a first direction on the conveyor;
   determining by the computer when the first end passes the fixed sensor while travelling on the conveyor;
   moving the movable sensor towards the second end and the movable sensor sensing the location of the second end;
   the computer determining a travel distance the first end has travelled past the fixed sensor when the movable sensor senses the location of the second end;
   the computer determining a sensor distance between the fixed sensor and the movable sensor when the movable sensor senses the location of the second end;
   the computer adding the travel distance to the sensor distance to calculate a length of the stem; and the computer determining a buck location on the stem based on the length of the stem.

6. The method according to claim 5, wherein the computer determines the travel distance by utilizing a travel distance means for determining a distance the first end has travelled past the fixed sensor.

7. The method according to claim 5, wherein the computer determines the travel distance by utilizing a conveyor encoder connected to the computer for determining a location of the conveyor, the conveyor encoder being connected to the computer.

8. The method according to claim 5, further comprising using a saw to cut the stem at the buck location determined by the computer.

9. The method according to claim 5, wherein the movable sensor is mounted on a track and further comprises a movable sensor encoder connected to the computer to determine location of the movable sensor.

* * * * *